(12) United States Patent
Danilov et al.

(10) Patent No.: US 10,248,326 B2
(45) Date of Patent: Apr. 2, 2019

(54) INCREMENTAL ERASURE CODING FOR STORAGE SYSTEMS

(71) Applicant: EMC IP Holding Company LLC, Hopkinton, MA (US)

(72) Inventors: Mikhail Danilov, Saint Petersburg (RU); Konstantin Buinov, Kirovsk (RU); Andrey Fomin, Vesevolozhsk (RU); Andrey Kurilov, Saint Petersburg (RU); Maxim Trusov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 58 days.

(21) Appl. No.: 15/398,819

(22) Filed: Jan. 5, 2017

(65) Prior Publication Data

US 2018/0004414 A1    Jan. 4, 2018

(30) Foreign Application Priority Data

Jun. 29, 2016   (RU) .................................. 2016125850

(51) Int. Cl.
   *G06F 3/06*    (2006.01)

(52) U.S. Cl.
   CPC .............. *G06F 3/061* (2013.01); *G06F 3/067* (2013.01); *G06F 3/0659* (2013.01); *G06F 3/0685* (2013.01)

(58) Field of Classification Search
   USPC ........................................................ 711/105
   See application file for complete search history.

(56) References Cited

U.S. PATENT DOCUMENTS

| | | |
|---|---|---|
| 6,070,003 A | 5/2000 | Gove et al. |
| 6,550,035 B1 | 4/2003 | Okita |
| 7,549,110 B2 | 6/2009 | Stek et al. |
| 7,559,007 B1 | 7/2009 | Wilkie |

(Continued)

OTHER PUBLICATIONS

Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.

(Continued)

*Primary Examiner* — Mano Padmanabhan
*Assistant Examiner* — Jean C Edouard
(74) *Attorney, Agent, or Firm* — Daly, Crowley, Mofford & Durkee, LLP (57) ABSTRACT

A method comprising: generating a storage chunk having a plurality of data fragments, the storage chunk stored in one or more storage devices; allocating space in a primary memory to store a plurality of coded fragments; receiving a plurality of I/O requests to write data; allocating space in the primary memory to store a next unfilled data fragment; processing a plurality of I/O requests to write data; and copying the coded fragments from the primary memory to the one or more storage devices. For each I/O request, writing the data to the next unfilled data fragment in the one or more storage devices, writing the data to the next unfilled data fragment in the primary memory, and if the data fragment in the primary memory is full, updating the coded fragments in the primary memory using the filled data fragment in the primary memory.

15 Claims, 6 Drawing Sheets

(56) References Cited

U.S. PATENT DOCUMENTS

| | | | |
|---|---|---|---|
| 7,581,156 | B2 | 8/2009 | Manasse |
| 8,458,515 | B1 | 6/2013 | Saeed |
| 8,532,212 | B2 | 9/2013 | Ito |
| 8,683,296 | B2 | 3/2014 | Anderson et al. |
| 8,683,300 | B2 | 3/2014 | Stek et al. |
| 8,762,642 | B2 | 6/2014 | Bates et al. |
| 8,914,706 | B2 | 12/2014 | Anderson |
| 9,753,807 | B1 | 9/2017 | Donlan et al. |
| 9,921,910 | B2 | 3/2018 | Sangamkar et al. |
| 2005/0038968 | A1* | 2/2005 | Iwamura ............ G06F 11/2058 711/162 |
| 2006/0105724 | A1 | 5/2006 | Nakao |
| 2006/0147219 | A1 | 7/2006 | Yoshino et al. |
| 2006/0155946 | A1* | 7/2006 | Ji ............................ G06F 3/0617 711/162 |
| 2008/0126357 | A1 | 5/2008 | Casanova et al. |
| 2009/0112953 | A1 | 4/2009 | Barsness et al. |
| 2010/0037056 | A1* | 2/2010 | Follis ................. G06F 11/1464 713/171 |
| 2010/0091842 | A1 | 4/2010 | Ikeda et al. |
| 2010/0180176 | A1 | 7/2010 | Yosoku et al. |
| 2010/0246663 | A1 | 9/2010 | Citta et al. |
| 2011/0029840 | A1* | 2/2011 | Ozzie ................. G06F 11/1004 714/763 |
| 2011/0053639 | A1 | 3/2011 | Etienne Suanez et al. |
| 2011/0055494 | A1 | 3/2011 | Roberts et al. |
| 2011/0184997 | A1* | 7/2011 | Grube ................. H04L 67/1097 707/827 |
| 2011/0196900 | A1 | 8/2011 | Drobychev et al. |
| 2012/0047339 | A1* | 2/2012 | Decasper ............ G06F 11/1076 711/162 |
| 2012/0051208 | A1 | 3/2012 | Li et al. |
| 2012/0060072 | A1* | 3/2012 | Simitci ............... H03M 13/373 714/756 |
| 2012/0106595 | A1 | 5/2012 | Bhattad et al. |
| 2013/0067187 | A1 | 3/2013 | Moss et al. |
| 2013/0159603 | A1* | 6/2013 | Whitney ............. G06F 12/0246 711/103 |
| 2014/0046997 | A1 | 2/2014 | Dain et al. |
| 2014/0201541 | A1* | 7/2014 | Paul .................... G06F 21/6245 713/193 |
| 2014/0380125 | A1 | 12/2014 | Calder et al. |
| 2015/0106578 | A1 | 4/2015 | Warfield et al. |
| 2016/0092109 | A1* | 3/2016 | Wu ........................ G06F 3/061 711/114 |
| 2016/0239384 | A1* | 8/2016 | Slik ..................... G06F 11/1076 |
| 2016/0246677 | A1* | 8/2016 | Sangamkar ......... G06F 11/1076 |
| 2017/0046127 | A1 | 2/2017 | Fletcher et al. |
| 2017/0242732 | A1 | 8/2017 | Vairavanathan et al. |
| 2017/0277915 | A1 | 9/2017 | Slik |
| 2017/0286436 | A1 | 10/2017 | Neporada et al. |

OTHER PUBLICATIONS

Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
Response to U.S. Non-Final Office Action dated Dec. 14, 2017 for U.S. Appl. No. 15/281,172, Response filed Apr. 9, 2018; 12 pages.
U.S. Non-Final Office Action dated Feb. 2, 2018 for U.S. Appl. No. 15/398,826; 16 Pages.
Response to U.S. Non-Final Office Action dated Nov. 27, 2017 for U.S. Appl. No. 15/186,576, Response filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/281,172, filed Sep. 30, 2016, Trusov et al.
U.S. Appl. No. 15/398,832, filed Jan. 5, 2017, Danilov et al.
U.S. Appl. No. 15/398,826, filed Jan. 5, 2017, Danilov et al.
Blömer et al., "An XOR-Based Erasure-Resilient Coding Scheme;" Article from CiteSeer; Oct. 1999; 19 Pages.
RCE and Response to Final Office Action dated Jun. 19, 2018 for U.S. Appl. No. 15/398,826, filed Aug. 23, 2018; 11 Pages.
Notice of Allowance dated Jul. 13, 2018 for U.S. Appl. No. 15/281,172; 13 Pages.
Non-Final Office Action dated Aug. 2, 2018 for U.S. Appl. No. 15/620,897; 21 Pages.
Final Office Action dated Jun. 19, 2018 for U.S. Appl. No. 15/398,826; 8 pages.
Notice of Allowance dated Oct. 16, 2018 for U.S. Appl. No. 15/398,826; 10 Pages.

\* cited by examiner

INCREMENTAL ERASURE CODING FOR STORAGE SYSTEMS

CROSS REFERENCE TO RELATED APPLICATIONS

This application claims priority to Russian Patent Application number 2016125850, filed Jun. 29, 2016, and entitled "INCREMENTAL ERASURE CODING FOR STORAGE SYSTEMS," which is incorporated herein by reference in its entirety.

BACKGROUND

Storage systems may provide a wide range of storage services, while achieving high scalability, availability, and serviceability. An example of a distributed storage system is Elastic Cloud Storage (ECS) from EMC Corporation of Hopkinton, Mass.

Erasure coding is a coding technique originally created as a forward error correction method for binary erasure channels. More recently, erasure coding has been used to protect data within storage systems. Existing erasure coding implementations may generate high I/O, such as high network and/or disk traffic.

SUMMARY

Described herein are embodiments of systems and methods for efficiently protecting data using erasure coding. In various embodiments, data to be encoded is stored in primary memory, e.g., random access memory (RAM). To allow encoding of large data chunks without exhausting primary memory, in some embodiments an incremental erasure coding technique may be used. Several embodiments provide faster encoding and reduced I/O compared to existing erasure coding implementations.

According to one aspect of the disclosure, a method comprises: generating a storage chunk having a plurality of data fragments, the storage chunk stored in one or more storage devices; allocating space in a primary memory to store a plurality of coded fragments; receiving a plurality of I/O requests to write data; allocating space in the primary memory to store a next unfilled data fragment; processing a plurality of I/O requests to write data; and copying the coded fragments from the primary memory to the one or more storage devices. The method further includes, for each I/O request: writing the data to the next unfilled data fragment in the one or more storage devices; writing the data to the next unfilled data fragment in the primary memory; and if the data fragment in the primary memory is full, updating the coded fragments in the primary memory using the filled data fragment in the primary memory.

In many embodiments, updating the coded fragments in primary memory using the full data fragment in primary memory comprises calculating $C_i=C_i+X_{i,j}*D_{full}$ for each coding fragment $C_i$, where X is a matrix of coding coefficients and $D_{full}$ is the full data fragment. In certain embodiments the plurality of data fragments include k data fragments, the plurality of coded fragments include m coded fragments, and the coded fragments copied to the one or more storage devices can be used to recover from a loss of m data fragments within the chunk. In various embodiments, the method further includes, for each I/O request, if the data fragment in the primary memory is full, removing the filled data fragment from the primary memory and allocating space in the primary memory to store a next unfilled data fragment. In some embodiments, the primary memory includes dynamic random-access memory (DRAM). In many embodiments, the storage devices comprise disk drives.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. In certain embodiments, the term "storage system" may encompass private or public cloud computing systems for storing data as well as systems for storing data comprising virtual infrastructure and those not comprising virtual infrastructure. In some embodiments, the term "I/O request" may refer to a request to read and/or write data. In many embodiments, the terms "client" and "user" may refer to any person, system, or other entity that may send I/O requests to a storage system.

In certain embodiments, the term "storage device" may refer to any non-volatile memory (NVM) device, including hard disk drives (HDDs), flash devices (e.g., NAND flash devices), and next generation NVM devices, any of which may be accessed locally and/or remotely (e.g., via a storage attached network (SAN)). In some embodiments, the term "storage device" may also refer to a storage array comprising one or more storage devices.

Figure 1:
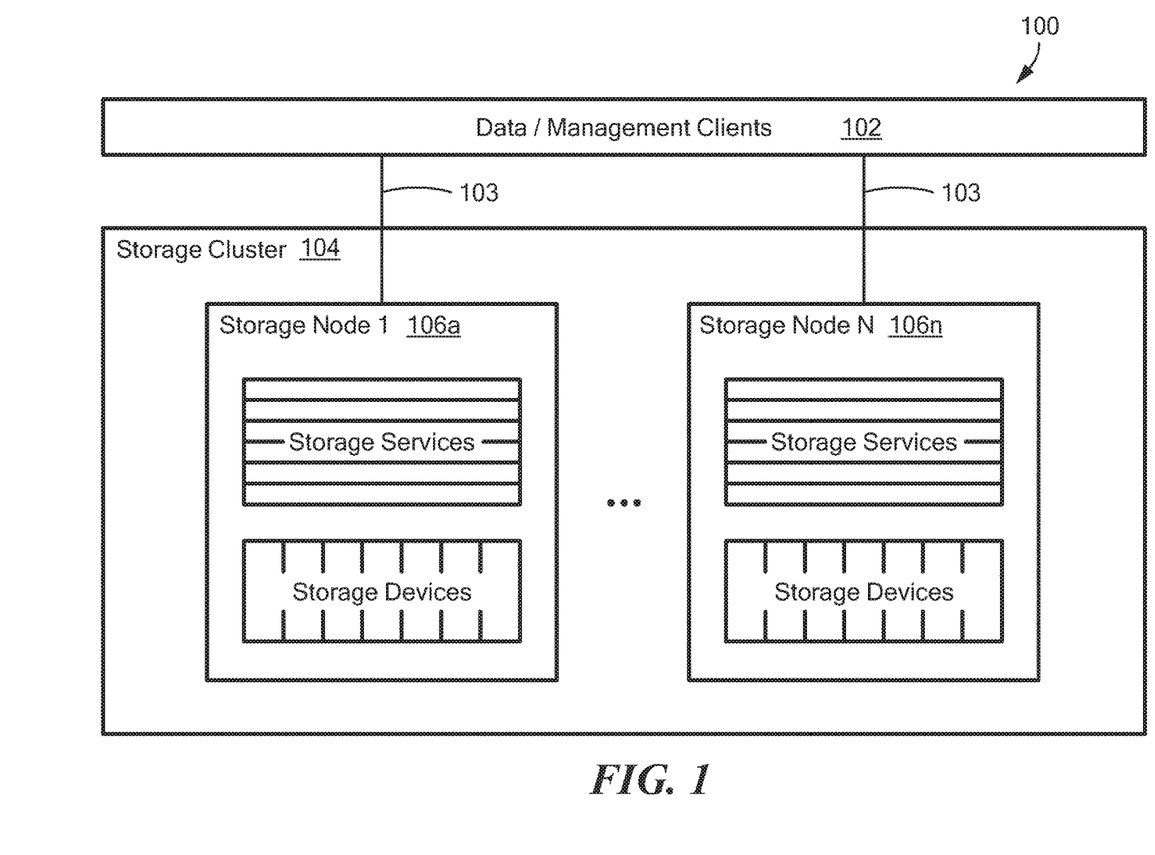
FIG. 1 is a block diagram of a storage system, in accordance with an embodiment of the disclosure.

FIG. 1 shows a storage system 100, in accordance with an embodiment of the disclosure. The storage system 100 includes one or more clients 102 in communication with a storage cluster 104 via a network 103. The storage cluster 104 includes one or more storage nodes 106a . . . 106n (generally denoted 106). In general operation, clients 102 issue requests to the storage cluster 104 to read and write data. A given request is received by any available storage node 106. The receiving node 106 processes the request locally and/or delegates request processing to one or more other nodes 106.

In some embodiments, the network may include any suitable type of communication network or combination thereof, including networks using protocols such as Ethernet, Internet Small Computer System Interface (iSCSI), Fibre Channel (FC), and/or wireless protocols. In certain embodiments, clients may include user applications, application servers, data management tools, and/or testing systems. In particular embodiments, a storage node may be the same as or similar to an embodiment shown in FIG. 1A and described below in conjunction therewith. In some embodiments, the storage cluster may utilize Elastic Cloud Storage (ECS) from EMC Corporation of Hopkinton, Mass.

Figure 1A:
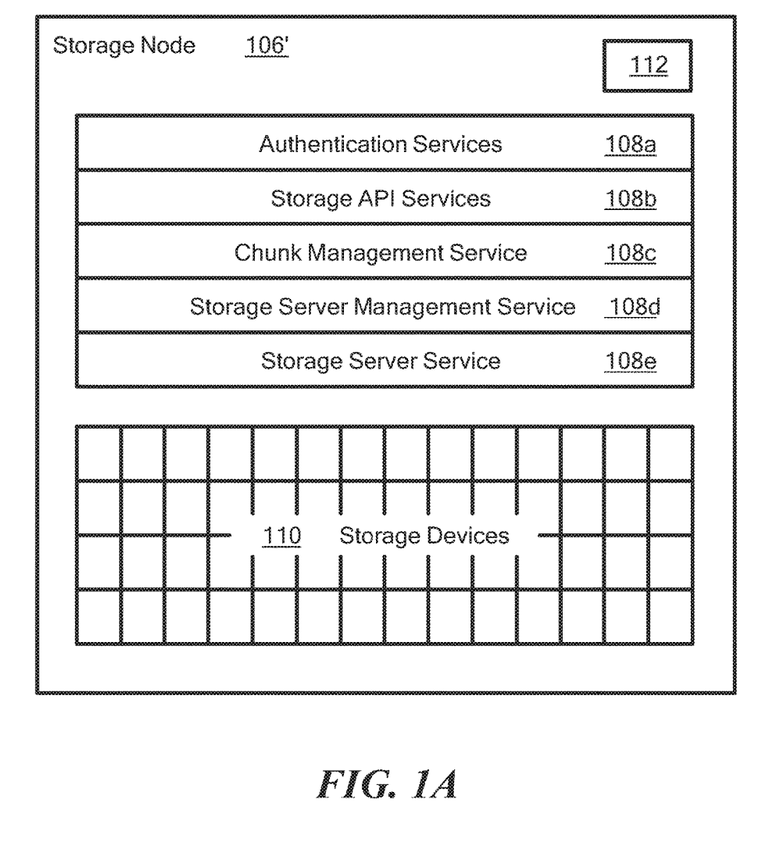
FIG. 1A is a block diagram of a storage node that may form a part of a storage system, in accordance with an embodiment of the disclosure.

FIG. 1A shows an illustrative storage node 106', in accordance with an embodiment of the disclosure. The storage node 106' includes one or more services 108, one or more storage devices 110, and primary memory 112. The services 108 include: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

In one embodiment, the storage node may include a processor and a non-volatile memory storing computer program code that when executed on the processor causes the processor to execute processes operable to perform functions of the services.

In some embodiments, storage devices may comprise one or more physical and/or logical storage devices attached to the storage node. In certain embodiments, storage devices may be provided as a storage array. In particular embodiments, storage devices may be provided as VNX or Symmetrix VMAX, which are available from EMC Corporation of Hopkinton, Mass.

In many embodiments, primary memory may correspond to physical memory, such as random access memory (RAM) or dynamic random-access memory (DRAM), and/or virtual memory. In some embodiments, primary memory may include volatile memory. In various embodiments, primary memory has significantly lower read and write times compared to storage devices.

In some embodiments, the storage devices may be partitioned into sets of fixed-sized blocks referred to as "chunks" within which user data (e.g., object data) may be stored. In certain embodiments, the size of a chunk is 128 MB. In certain embodiments, a given object may be segmented and stored across multiple chunks, and a given chunk may store segments of multiple different objects. In various embodiments, new data may be appended to a chunk, but existing chunk data cannot be modified. In many embodiments, when a chunk becomes full, it may be marked as "sealed." In certain embodiments, sealed chunks are immutable.

In particular embodiments, the storage node does not acknowledge a data write request (e.g., does not send a response to a client) until the data is stored within one or more storage devices.

In various embodiments, the storage node 106' may implement processing described below in conjunction with the embodiments of FIGS. 2-4 to protect against data loss. In particular embodiments, the storage chunk management service 108c may be configured to perform such processing.

Figure 2:
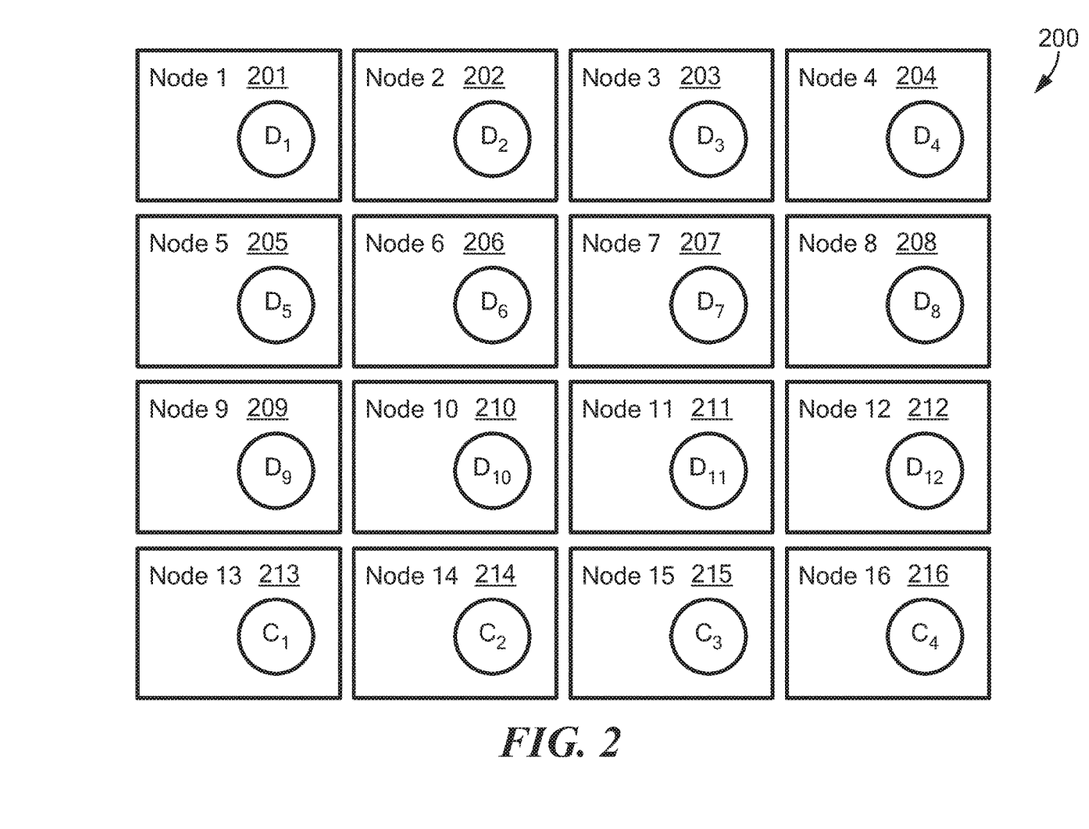
FIG. 2 is a diagram of a storage system using erasure coding to protect data, in accordance with an embodiment of the disclosure.

Referring to FIG. 2, in some embodiments, a storage system may use erasure coding to protect against data loss. In the embodiment shown, a storage system 200 performs erasure coding on chunks that have been sealed. A sealed chunk is split into k data fragments $D_1, D_2, \ldots, D_k$ and, using coding techniques described below, m coded fragments $C_1, C_2, \ldots, C_m$ are be generated from the k fragments. The coded fragments C include redundant information that can be used to regenerate (or "restore") data fragments D in certain situations.

In some embodiments, the storage system may use a coding scheme that allows it to tolerate the loss of any m data fragments within a chunk. In the embodiment of FIG. 2, k=12 and m=4, although other values of k and m can be used.

In certain embodiments, a chunk may be split into k equal size data fragments $D_1, D_2, \ldots, D_k$, with padding or other data complement being added as needed as needed to ensure the data fragments are of equal size.

Referring again to FIG. 2, the storage system 200 is a distributed storage system having a plurality of storage nodes 201-216, any of which may be the same as or similar to embodiments described above in conjunction with FIG. 1A. The data fragments $D_1, D_2 \ldots, D_k$ and coded fragments $C_1, C_2, \ldots, C_m$ are stored across multiple storage nodes 201-216. The storage system 200 includes sixteen (16) storage nodes 201-216, with each node 201-216 storing exactly one data fragment D or coded fragment C.

In other embodiments, a give storage node may store multiple data fragments and/or multiple coded fragments (e.g., if k+m is greater than the number of available nodes). In still other embodiments, some storage nodes may not store any data fragments or coded fragments (e.g., if k+m is less than the number of available nodes). In various embodiments, a storage system may include fewer than or more than sixteen (16) storage nodes.

Referring again to FIG. 2, if a data fragment D is lost (e.g., due to a node failure, a storage device failure, or data corruption), the lost data fragment can be recovered using other data fragments D and coded fragments C. At least k unique fragments—either data fragments or coded fragments—within the same chunk are required to decode a lost data fragment. Thus, the storage system 200 is able to tolerate the loss of m fragments within a given chunk.

In some embodiments, a matrix-based Reed-Solomon erasure coding technique may be used for data protection within a storage system. In certain embodiments, a storage chunk may be split into k data fragments $D_1, D_2, \ldots, D_k$ and the data fragments D may be arranged as a column vector ("data vector"). m coded fragments $C_1, C_2, \ldots, C_m$ may be generated by multiplying an m×k matrix of coding coefficients $X_{i,j}$ (referred to herein as a "coding matrix") by the k-element data vector. In many embodiments, a second m×k matrix of coefficients $Y_{i,j}$ (referred to herein as a "decoding matrix") can be used to recover unavailable data fragments. In certain embodiments, the coefficients of the coding matrix X and/or the decoding matrix Y may be selected using known erasure coding techniques and/or based upon the specific erasure coding algorithm used. In some embodiments, the coefficients of the coding matrix X and/or the decoding matrix Y may be selected such that the storage system 200 can tolerate the loss of m data fragments within a chunk.

In various embodiments, each chunk may be filled, sealed, and encoded by a single storage node. As discussed above, new chunk data may be synchronously written to a storage device (e.g., a storage device 110 in FIG. 1A). In certain embodiments, there is may be a delay between the time that data is written to a chunk and the time when that chunk is filled and ready to be encoded. In some embodiments, in order to avoid having to read chunk data back from storage devices during erasure coding, a storage node may keep a copy of chunk data in primary memory while it is being filled; after the chunk is sealed, the storage node may perform erasure encoding on the chunk data in its primary memory.

Figure 3:
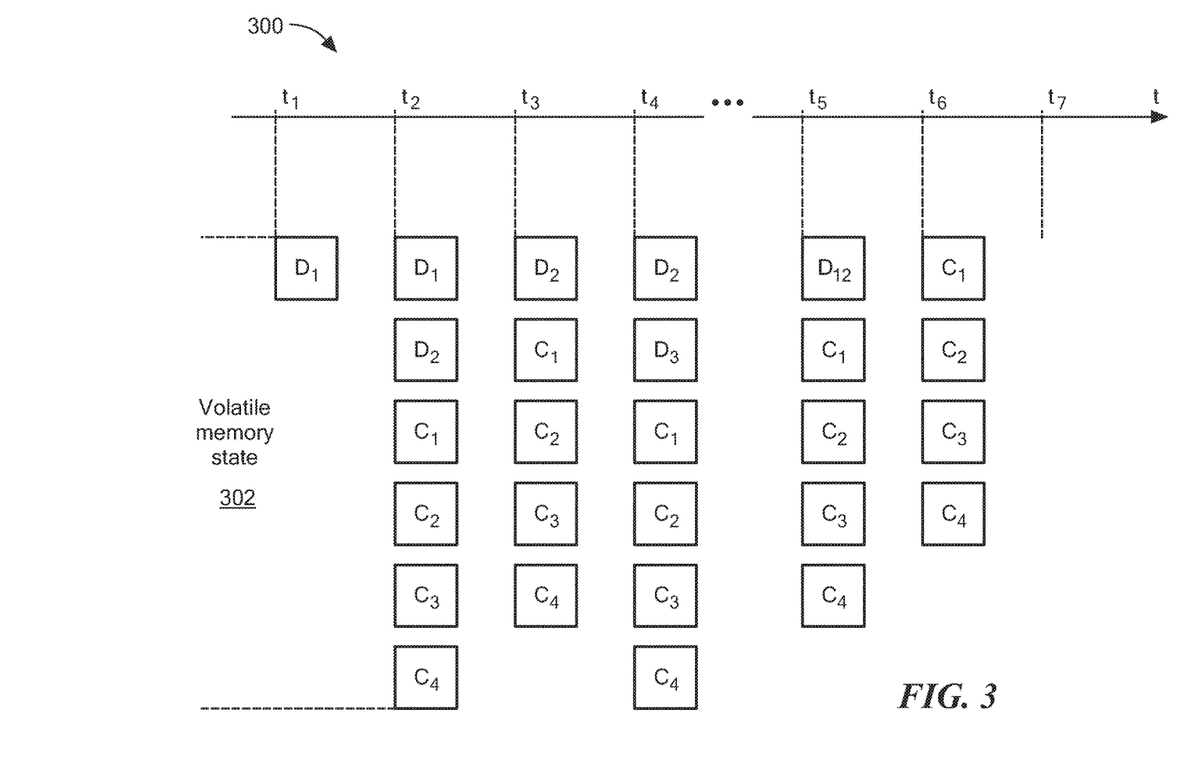
FIG. 3 is a diagram of an incremental erasure coding process, in accordance with an embodiment of the disclosure.

Referring to FIG. 3, in various embodiments an incremental erasure coding process may be used within a storage system. In some embodiments, incremental erasure coding may require less primary memory compared to existing erasure coding implementations and/or may help reduce the number of I/O operations needed to encode (or decode) a chunk. In certain embodiments, incremental erasure coding can help balance CPU workload produced by erasure coding.

As discussed above, in various embodiments a matrix-based Reed-Solomon erasure coding may be used wherein the ith coding fragment $C_i$ may be calculated as:

$$C_i = \sum_{j=1}^{k} X_{i,j} * D_j$$

or incrementally as a series of steps:

$$C_i = X_{i,1} * D_1 \quad (1)$$

$$C_i = C_i + X_{i,2} * D_2 \quad (2)$$

$$\ldots$$

$$C_i = C_i + X_{i,k} * D_k \quad (k)$$

In various embodiments, chunks are filled with data in append-only mode. Thus, In certain embodiments some data fragments D may be filled before others. In certain embodiments, data fragments are filled in order from $D_1$ to $D_k$.

Referring to the embodiment of FIG. 3, a process 300 generates m coding fragments $C_1 \ldots C_m$ incrementally, using data stored in primary memory 302. In the embodiment of FIG. 3, m=4.

At time $t_1$, an I/O request to write data is received by a storage node. The storage node generates a new chunk to store the data, the chunk being stored within one or more storage devices. The chunk is logically divided into k data fragments $D_1 \ldots D_k$. In the embodiment of FIG. 3, k=12. The data is written to a first data fragment $D_1$ within the new chunk. In addition to writing the data to data fragment $D_1$ within storage devices, the storage node stores the data within primary memory 302.

In some embodiments, the storage node may allocate space within primary memory 302 and copy the data thereto. In certain embodiments, the storage device allocates enough space in primary memory 302 to store a full data fragment D.

Referring again to FIG. 3, at time $t_2$, another request to write data is received by the storage node. The data is written to the next unfilled data fragment within the chunk. In the embodiment shown, it is assumed that data fragment $D_1$ becomes full before $t_2$ and that a second data fragment $D_2$ is the next unfilled data fragment at $t_2$. Thus, the data is written to the second data fragment $D_2$. In addition to writing the data to data fragment $D_2$ within storage devices, the storage node stores the data within primary memory 302.

When a data fragment becomes full, an incremental encoding step is performed. At time $t_2$, each of the m coding fragments $C_i \ldots C_m$ may be initialized as:

$$C_i = X_{i,1} * D_1.$$

In some embodiments, space for m coding fragments C may be allocated in the primary memory 302 when the first step of incremental erasure coding is performed. In other embodiments, space for m coding fragments C may be allocated in the primary memory 302 when the chunk is generated.

In certain embodiments, once a step of iterative erasure coding is complete, a data fragment may be removed from primary memory. In some embodiments, removing a data fragment from primary memory may include deallocating a section of primary memory storing the data fragment. In other embodiments, removing a data fragment from primary memory may include releasing memory within a memory pool so that it can be reused. In various embodiments, the m coding fragments C (having intermediate results) and any unfilled data fragments D may remain in primary memory.

In the embodiment of FIG. 3, at time $t_2$ the first step of iterative erasure coding is complete and the first data fragment $D_1$ is removed from primary memory 302. The m coding fragments C and unfilled data fragment $D_2$ remains in primary memory 302.

At time $t_4$, the second data fragment $D_2$ is filled and the storage node 106' begins writing data to a third data fragment $D_3$ within the chunk. Space for fragment $D_3$ is e allocated in primary memory 302 and the coded fragments C are updated using:

$$C_i = C_i + X_{i,2} * D_2.$$

In addition, the second data fragment $D_2$ is removed from primary memory 302.

The iterative erasure coding process 300 repeats until the kth data fragment $D_k$ is filled and each of the coded fragments C is updated accordingly.

In various embodiments, after erasure coding is complete, the coded fragments C may be copied from primary memory to one or more storage devices. In various embodiments, any remaining coded fragments C and/or data fragments D associated with the chunk may be removed from primary memory.

In the embodiment of FIG. 3, erasure coding completes at time $t_6$ and, at time $t_7$, the coding fragments $C_1 \ldots C_4$ are stored within storage devices and removed from primary memory 302

In certain embodiments, incremental erasure coding may use two (2) to three (3) times less primary memory compared to existing techniques. According to some embodiments, the amount of primary memory 302 allocated for erasure coding is fixed and incremental erasure coding may allow a storage system (or a storage node therein) to handle two (2) to three (3) times as many write requests compared to existing techniques.

In some embodiments, a storage system may use an incremental approach to both erasure coding and decoding.

In certain embodiments, incremental encoding and/or decoding can be used when the amount of available primary memory 302 is limited and/or the size of data to be encoded/decoded is relatively large.

In some embodiments, incremental erasure coding can be combined with existing erasure coding acceleration techniques. For example, in particular embodiments, erasure encoding can be accelerated using special processor instructions like VPERM for PowerPC and/or PSHUFB for Intel processors.

Figure 4:
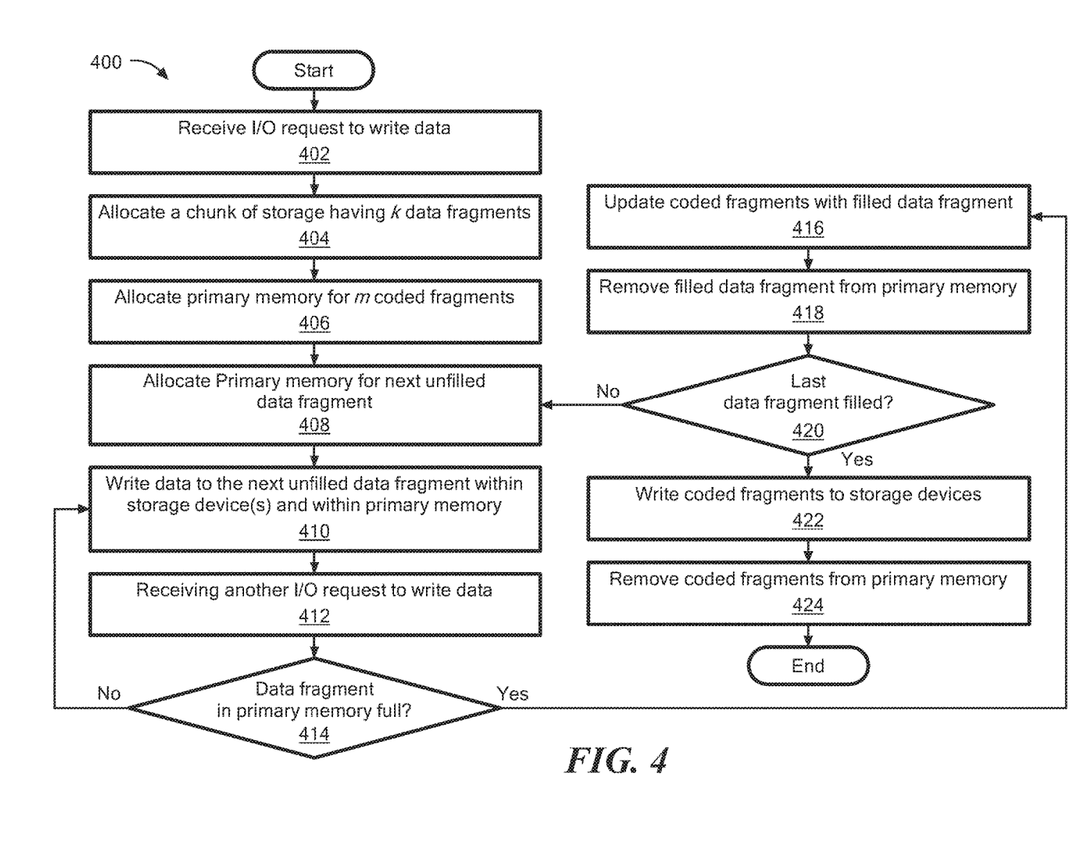
FIG. 4 is a flow diagram showing a method that may be used within the systems of FIGS. 1 and 1A, in accordance with an embodiment of the disclosure.

FIG. 4 is a flow diagram showing illustrative processing in accordance with embodiments of the disclosure. In some embodiments, processing may be implemented within one or more nodes 106 of storage system 100 (FIG. 1). Rectangular elements (typified by element 402) herein denoted "processing blocks," represent computer software instructions or groups of instructions. Diamond shaped elements (typified by element 414) herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 4, a process 400 begins at block 402 where an I/O request to write data is received. In some embodiments, the request may be received from a client. In certain embodiments, the request data may include object data.

Referring again to FIG. 4, at block 404, a new chunk of storage is allocated having k data fragments. At block 406, primary memory is allocated for m coded fragments. In one embodiment, the coded fragments in primary memory are initialized to zero ($C_i=0$).

Referring again to FIG. 4, at block 408, primary memory is allocated for the next unfilled data fragment within the chunk. In some embodiments, the k data fragments are filled in order, starting with $D_1$ and finishing with $D_k$.

Referring again to FIG. 4, at block 410, the data is written to the next unfilled data fragment within one or more storage devices. In addition, the data is written to the next unfilled data fragment within primary memory.

At block 412, another request to write data is received. At block 414, if the data fragment in primary memory is full, then the coded fragments in primary memory may be updated using the full data fragment in primary memory (block 416). In certain embodiments, updating coded fragments may include using the incremental erasure coding equations described above in conjunction with FIG. 3.

Referring again to FIG. 4, at block 418, the full data fragment may be removed from primary memory.

At block 420, if the data fragments within the chunk have been filled (e.g., if the recently filled data fragment corresponds to data fragment $D_k$), then the coded fragments in memory may be written to one or more storage devices (block 422) and removed from primary memory (block 424). Otherwise, processing may repeat from block 408 until all data fragments within the chunk are filled.

In some embodiments, incremental erasure coding may be performed asynchronous to I/O request processing. Thus, for example, processing described above in conjunction with blocks 416, 418, 422, and 424 may be performed as background tasks separate from I/O processing.

Figure 5:
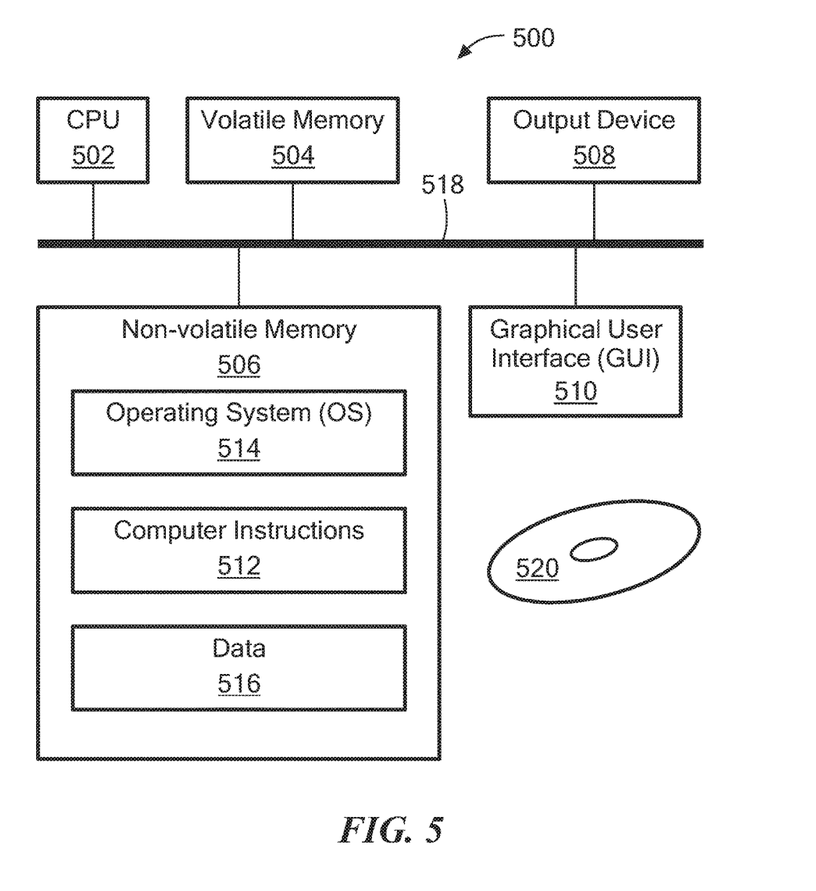
FIG. 5 is a schematic representation of a computer for use with the systems of FIGS. 1 and 1A, in accordance with an embodiment of the disclosure.

FIG. 5 shows an illustrative computer or other processing device 500 that can perform at least part of the processing described herein, in accordance with an embodiment of the disclosure. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504. In one embodiment, an article 520 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more a physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method comprising:
    generating a storage chunk having a plurality of data fragments, the storage chunk stored in one or more storage devices;
    allocating space in a primary memory to store a plurality of coded fragments;
    receiving a plurality of I/O requests to write data;
    allocating space in the primary memory to store a next unfilled data fragment;
    processing a plurality of I/O requests to write data, including for each I/O request:
    writing the data to the next unfilled data fragment in the one or more storage devices;
    writing the data to the next unfilled data fragment in the primary memory; and
    if the data fragment in the primary memory is full, updating the coded fragments in the primary memory using the filled data fragment in the primary memory, removing the filled data fragment from the primary memory and allocating space in the primary memory to store a next unfilled data fragment; and
    copying the coded fragments from the primary memory to the one or more storage devices.

2. The method of claim 1 wherein updating the coded fragments in primary memory using the full data fragment in primary memory comprises calculating $C_i=C_i+X_{i,j}*D_{full}$ for each coding fragment $C_i$, where X is a matrix of coding coefficients and $D_{full}$ is the full data fragment.

3. The method of claim 1 wherein the plurality of data fragments include k data fragments, the plurality of coded fragments include m coded fragments, the method further comprising in an event of a loss of m data fragments within the chunk, accessing a number of k unique data fragments or coded fragments and using information from the k unique data fragments or the coded fragments to decode the m data fragments within the chunk.

4. The method of claim 1 wherein the primary memory includes dynamic random-access memory (DRAM).

5. The method of claim 1 wherein the storage devices comprise disk drives.

6. A system comprising:
    one or more processors;
    a volatile memory; and
    a non-volatile memory storing computer program code that when executed on the processor causes execution across the one or more processors of a process operable to perform the operations of:
    generating a storage chunk having a plurality of data fragments, the storage chunk stored in one or more storage devices;
    allocating space in a primary memory to store a plurality of coded fragments;
    receiving a plurality of I/O requests to write data;
    allocating space in the primary memory to store a next unfilled data fragment;
    processing a plurality of I/O requests to write data, including for each I/O request:
    writing the data to the next unfilled data fragment in the one or more storage devices;
    writing the data to the next unfilled data fragment in the primary memory; and
    if the data fragment in the primary memory is full, updating the coded fragments in the primary memory using the filled data fragment in the primary memory, removing the filled data fragment from the primary memory and allocating space in the primary memory to store a next unfilled data fragment; and
    copying the coded fragments from the primary memory to the one or more storage devices.

7. The system of claim 6 wherein updating the coded fragments in primary memory using the full data fragment in primary memory comprises calculating $C_i=C_i+X_{i,j}*D_{full}$ for each coding fragment $C_i$, where X is a matrix of coding coefficients and $D_{full}$ is the full data fragment.

8. The system of claim 6 wherein the plurality of data fragments include k data fragments, the plurality of coded fragments include m coded fragments, the operations further comprising in an event of a loss of m data fragments within the chunk, accessing a number of k unique data fragments or coded fragments and using information from the k unique data fragments or the coded fragments to decode the m data fragments within the chunk.

9. The system of claim 6 wherein the primary memory includes dynamic random-access memory (DRAM).

10. The system of claim 6 wherein the storage devices comprise disk drives.

11. A computer program product tangibly embodied in a non-transitory computer-readable medium, the computer-readable medium storing program instructions that are executable to:
    generate a storage chunk having a plurality of data fragments, the storage chunk stored in one or more storage devices;
    allocate space in a primary memory to store a plurality of coded fragments;
    receive a plurality of I/O requests to write data;
    allocate space in the primary memory to store a next unfilled data fragment;
    process a plurality of I/O requests to write data, including for each I/O request:
    write the data to the next unfilled data fragment in the one or more storage devices;
    write the data to the next unfilled data fragment in the primary memory; and
    if the data fragment in the primary memory is full, update the coded fragments in the primary memory using the filled data fragment in the primary memory, removing the filled data fragment from the primary memory and allocating space in the primary memory to store a next unfilled data fragment; and
    copy the coded fragments from the primary memory to the one or more storage devices.

12. The computer program product of claim 11 wherein updating the coded fragments in primary memory using the full data fragment in primary memory comprises calculating $C_i = C_i + X_{i,j} * D_{full}$ for each coding fragment $C_i$, where X is a matrix of coding coefficients and $D_{full}$ is the full data fragment.

13. The computer program product of claim 11 wherein the plurality of data fragments include k data fragments, the plurality of coded fragments include m coded fragments, the program instructions further configured to, in the event of a loss of m data fragments within the chunk, access a number of k unique data fragments or coded fragments and use information from the k unique data fragments or the coded fragments to decode the m data fragments within the chunk.

14. The computer program product of claim 11 wherein the primary memory includes dynamic random-access memory (DRAM).

15. The computer program product of claim 11 wherein the storage devices comprise disk drives.

* * * * *